(12) United States Patent
Goto et al.

(10) Patent No.: US 10,128,722 B2
(45) Date of Patent: Nov. 13, 2018

(54) ELECTRICAL CONNECTION STRUCTURE, TERMINAL STRUCTURE, AND VEHICLE

(71) Applicant: HONDA MOTOR CO., LTD., Tokyo (JP)

(72) Inventors: Yusuke Goto, Wako (JP); Hiroo Yamaguchi, Wako (JP); Hiroshi Otsuka, Wako (JP); Nobuchika Ukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/352,606

(22) Filed: Nov. 16, 2016

(65) Prior Publication Data

US 2017/0179786 A1 Jun. 22, 2017

(30) Foreign Application Priority Data

Dec. 21, 2015 (JP) ................. 2015-248670

(51) Int. Cl.
*H02P 27/06* (2006.01)
*H02M 7/537* (2006.01)
*H02K 5/22* (2006.01)
*H02K 11/33* (2016.01)
*B60L 11/18* (2006.01)
*H01R 13/24* (2006.01)
*B60L 3/12* (2006.01)

(52) U.S. Cl.
CPC .......... *H02K 5/225* (2013.01); *B60L 11/1803* (2013.01); *H01R 13/2428* (2013.01); *H02K 11/33* (2016.01); *H02P 27/06* (2013.01); *B60L 3/12* (2013.01)

(58) Field of Classification Search
None
See application file for complete search history.

(56) References Cited

U.S. PATENT DOCUMENTS

| | | | |
|---|---|---|---|
| 2003/0064277 A1* | 4/2003 | Sugiura | H01M 8/0206 429/434 |
| 2008/0049476 A1* | 2/2008 | Azuma | B60L 3/12 363/131 |
| 2016/0020678 A1* | 1/2016 | Hirano | H02K 5/18 310/64 |

FOREIGN PATENT DOCUMENTS

| | | |
|---|---|---|
| JP | 62-193300 | 8/1987 |
| JP | 01-087598 U | 6/1989 |
| JP | 2009-136041 | 6/2009 |

(Continued)

OTHER PUBLICATIONS

Japanese Office Action for corresponding JP Application No. 2015-248670, dated Aug. 1, 2017 (w/ English machine translation).

(Continued)

*Primary Examiner* — Bentsu Ro
*Assistant Examiner* — Zemenay Truneh
(74) *Attorney, Agent, or Firm* — Mori & Ward, LLP

(57) ABSTRACT

An electrical connection structure includes a first conductor, a second conductor, and a conductive spring. The first conductor includes a first plate. The second conductor includes a second plate opposite to the first plate. The conductive spring is provided between the first plate and the second plate so as to be pressed by the first plate and the second plate. The conductive spring includes a plurality of first contact points contacting with the first plate and a plurality of second contact points contacting with the second plate.

19 Claims, 6 Drawing Sheets

(56) References Cited

FOREIGN PATENT DOCUMENTS

| | | |
|---|---|---|
| JP | 2013-150472 | 8/2013 |
| JP | 2015-060646 | 3/2015 |
| JP | 2015-228333 | 12/2015 |
| WO | WO 2005/015692 | 2/2005 |

OTHER PUBLICATIONS

Japanese Office Action for corresponding JP Application No. 2015-248670, dated Feb. 27, 2018 (w/ English machine translation).

* cited by examiner

ELECTRICAL CONNECTION STRUCTURE, TERMINAL STRUCTURE, AND VEHICLE

CROSS-REFERENCE TO RELATED APPLICATIONS

The present application claims priority under 35 U. S. C. § 119 to Japanese Patent Application No. 2015-248670, filed on Dec. 21, 2015. The contents of this application are incorporated herein by reference in their entirety.

BACKGROUND OF THE INVENTION

Field of the Invention

The present invention relates to an electrical connection structure, a terminal structure, and a vehicle.

Discussion of the Background

Structures that enable electrical connection in a vehicle have been proposed (Japanese Patent Application Publication No. 2013-150472 and Japanese Patent Application Publication No. 2009-136041).

Japanese Patent Application Publication No. 2013-150472 discloses a structure including a coupler that electrically connects a motor and an inverter, and that has: bus bars provided in one of a facing part of the motor and a facing part of the inverter, and protruding toward the other; and contacted portions provided in the other of the facing parts and brought into contact with the bus bars. The contacted portions are downwardly-opened sockets for receiving the bus bars extending from lower to upper parts, and have three slots.

In Japanese Patent Application Publication No. 2009-136041, the tip end side of an output terminal (or input terminal) is bent to form a pressure contact portion, while a spring-like terminal fitting formed of a conductive metal plate is attached on the surface of a conductor of a printed circuit board. Then, the pressure contact portion is pressed against the spring-like terminal fitting to be electrically connected.

SUMMARY OF THE INVENTION

According to a first aspect of the present invention, an electrical connection structure includes a first conductor, a second conductor, and a conductive spring. The first conductor includes a first plate. The second conductor includes a second plate opposite to the first plate. The conductive spring is provided between the first plate and the second plate so at to be pressed by the first plate and the second plate. The conductive spring includes a plurality of first contact points contacting with the first plate and a plurality of second contact points contacting with the second plate.

According to a second aspect of the present invention, a terminal structure includes a conductor, an insulator, and a conductive spring. The conductor includes a plate. The insulator supports the conductor. The conductive spring is attached to the insulator or the conductor so as to be provided on the plate. The conductive spring includes a first contact portion and a second contact portion. The first contact portion has a plurality of contact points with the plate. The second contact portion is opposite to the first contact portion and has a plurality of contact points.

According to a third aspect of the present invention, a vehicle includes a driving motor, a converter, a motor housing, a converter case, a first bus bar, a second bus bar, and a conductive spring. The converter converts an input current input to the driving motor or an input voltage input to the driving motor. The motor housing accommodates the driving motor. The converter case accommodates the converter and is attached to the motor housing. The first bus bar has a first surface and connects the converter with an output terminal of the converter case. The second bus bar has a second surface opposite to the first surface and connects an input terminal of the motor housing with the driving motor. The conductive spring is provided between the first flat surface and the second flat surface so as to be pressed by the first flat surface and the second flat surface and has a plurality of first contact points contacting with the first flat surface and a plurality of second contact points contacting with the second flat surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
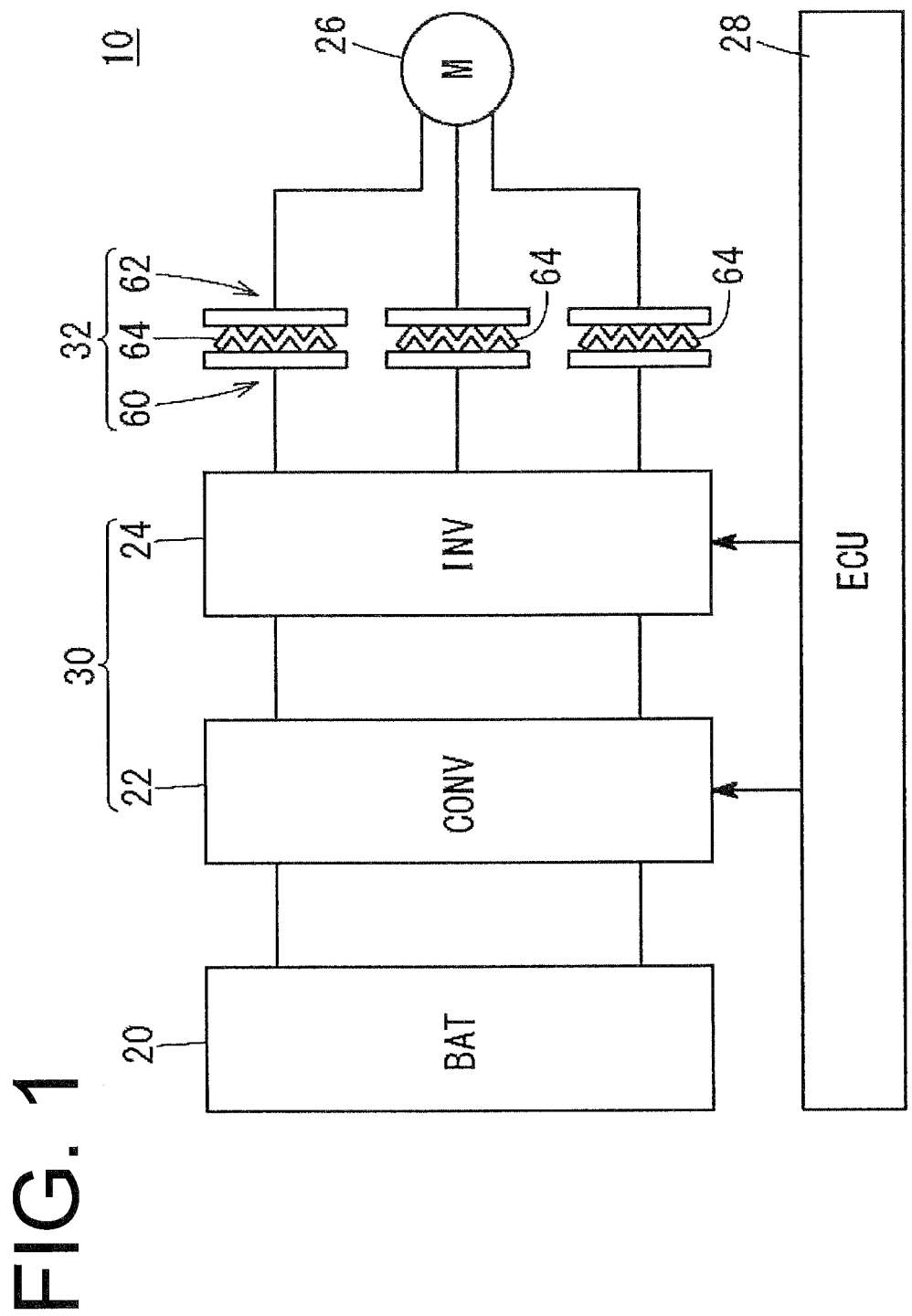
FIG. 1 is a diagram showing an electric circuit, which is a part of a vehicle of a first embodiment of the present invention.

The embodiments will now be described with reference to the accompanying drawings, wherein like reference numerals designate corresponding or identical elements throughout the various drawings.

A. First Embodiment

<A-1. Configuration of Vehicle 10>

[A-1-1. Overall Configuration]

Figure 2:
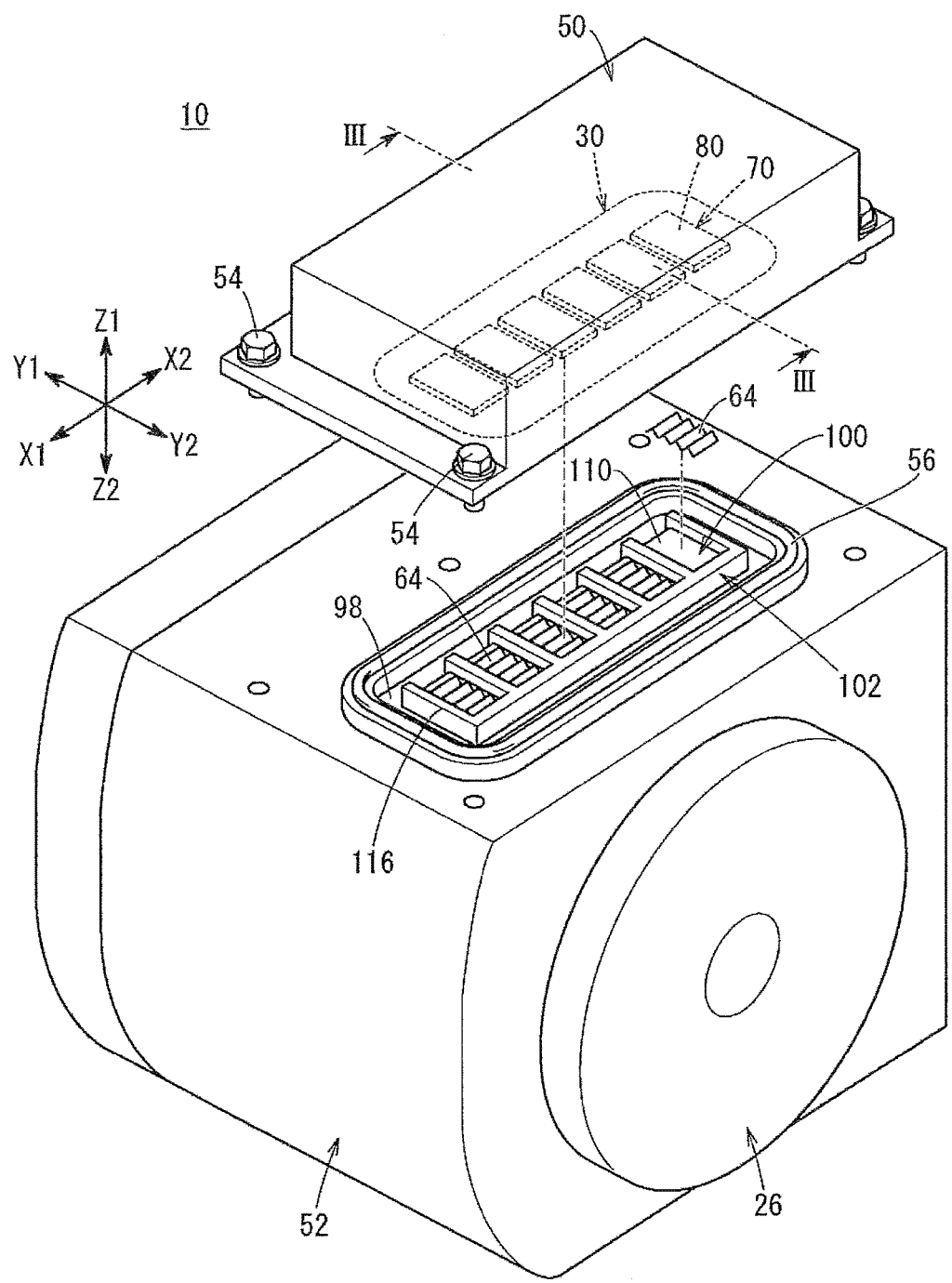
FIG. 2 is a simplified perspective view of a part of the vehicle of the first embodiment.
Figure 3:
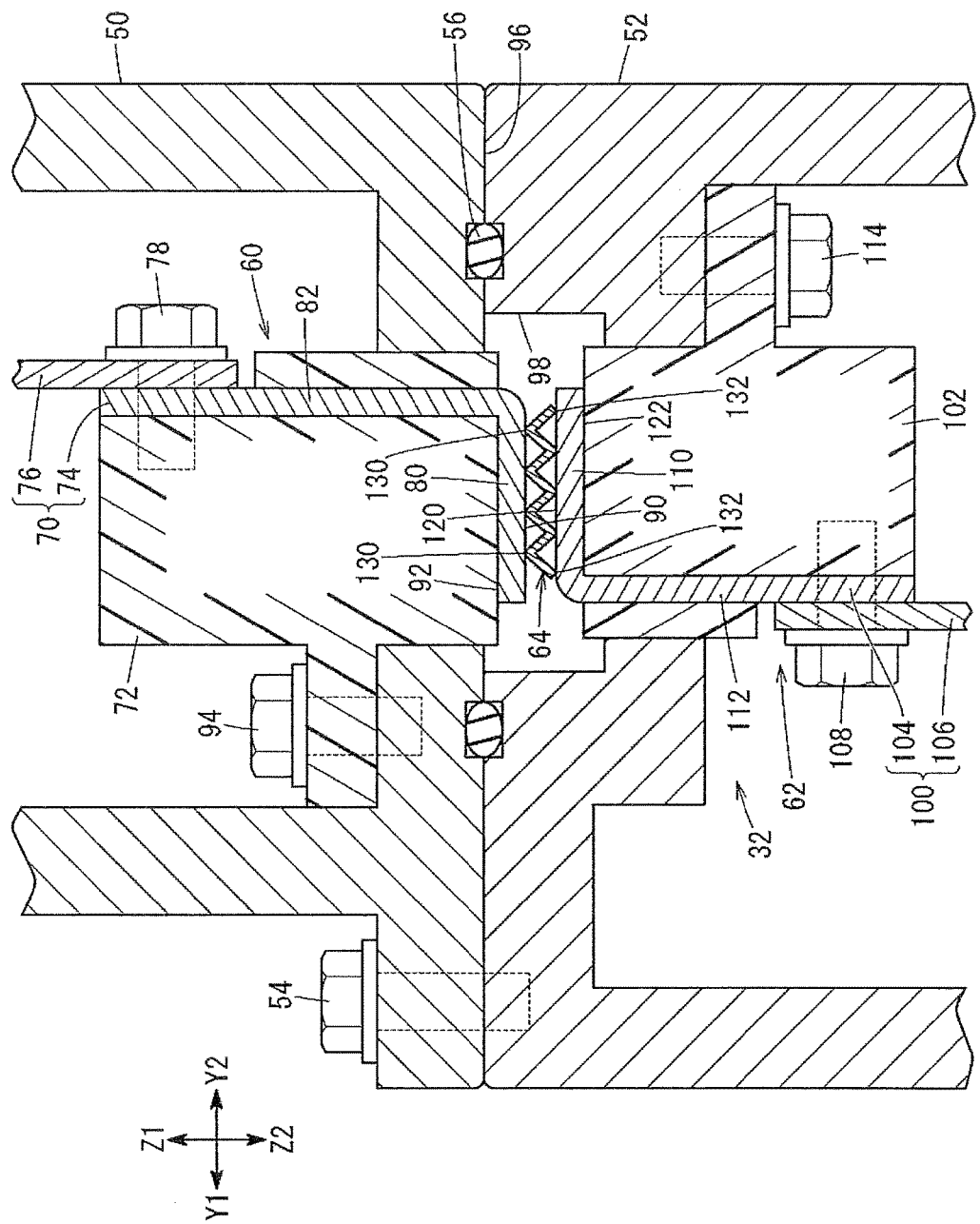
FIG. 3 is a simplified cross-sectional view taken along line III-III of FIG. 2.

FIG. 1 is a diagram showing an electric circuit, which is apart of a vehicle 10 of a first embodiment of the present invention. FIG. 2 is a simplified perspective view of a part of the vehicle 10 of the first embodiment. FIG. 3 is a simplified cross-sectional view taken along line III-III of FIG. 2. In FIGS. 2 and 3, arrows X1, X2 indicate the longitudinal direction of the vehicle 10, arrows Y1, Y2 indicate the width direction of the vehicle 10, and arrows Z1, Z2 indicate the vertical direction of the vehicle 10 (the same shall apply in later-mentioned FIGS. 5 and 6). The vehicle 10 of the first embodiment is a so-called battery vehicle. Instead, the vehicle 10 may be an electric vehicle such as a hybrid vehicle.

As shown in FIG. 1, the vehicle 10 has a battery 20, a converter 22, an inverter 24, a driving motor 26 (also referred to as "motor 26" below), and an electronic control unit 28 (hereinafter referred to as "ECU 28"). The converter 22 and the inverter 24 constitute a power control unit 30 (hereinafter referred to as "PCU 30"). An electrical connection structure 32 is provided between the inverter 24 and the motor 26.

[A-1-2. Battery 20]

The battery 20 is a storage (energy storage) including multiple battery cells, and capable of outputting a high voltage (several hundred volts). For example, a lithium ion secondary battery or a nickel-metal hydride secondary battery may be used as the battery. A storage such as a capacitor may be used instead of or in addition to the battery 20.

[A-1-3. Converter 22 and Inverter 24]

The converter 22 (converter) converts an output voltage of the battery 20 (input voltage received by motor 26), by use of multiple switching elements and a reactor (neither of which are shown). The inverter 24 (converter) converts a direct current from the converter 22 (input current received by motor 26) into an alternating current, by use of multiple switching elements. The converter 22 and the inverter 24 control output of the driving motor 26.

As shown in FIG. 2, the PCU 30 is accommodated inside a PCU case 50 (first case, converter case). The PCU case 50 is provided to protect the PCU 30, and is fixed to a motor housing 52 (second case) through bolts 54. A seal member 56 is interposed between the PCU case 50 and the motor housing 52 (see FIGS. 2 and 3).

[A-1-4. Driving Motor 26]

The driving motor 26 is a three-phase AC brushless motor, and generates power Ttrc as a driving source for travel of the vehicle 10 and supplies it to an unillustrated wheel (driving wheel) side. The motor 26 also performs regeneration at the time of braking of the vehicle 10, and supplies regenerated electric power Preg to the battery 20. As shown in FIG. 2, the motor 26 is accommodated inside the motor housing 52.

[A-1-5. ECU 28]

The ECU 28 calculates a target power Ttrc_tar of the motor 26 by use of output from various sensors (not shown), and controls the switching elements of the PCU 30 in such a manner as to achieve the target power Ttrc_tar.

[A-1-6. Electrical Connection Structure 32]

(A-1-6-1. Overview)

The electrical connection structure 32 electrically connects the inverter 24 (or PCU case 50) and the motor 26 (or motor housing 52). As shown in FIG. 3 and other drawings, the electrical connection structure 32 has a first terminal structure 60 on the PCU 30 side, a second terminal structure 62 on the motor 26 side, and a conductive spring member 64 (also referred to as "spring member 64" below).

(A-1-6-2. PCU 30-Side First Terminal Structure 60)

(A-1-6-2-1. Overall Configuration of First Terminal Structure 60)

As shown in FIG. 3, the first terminal structure 60 has first bus bars 70 (first conductive member, conductive member) and a first terminal block 72 (first insulating member). In the first embodiment, the motor 26 is a three-phase motor (see FIG. 1), and two first bus bars 70 are assigned to each of the phases. Hence, the total number of first bus bars 70 is six (see number of conductive spring members 64 in FIG. 2). The total number of first bus bars 70 may be varied (basically a multiple of three). As can be seen from the arrangement of the conductive spring members 64 in FIG. 2, the first bus bars 70 are arranged in parallel.

(A-1-6-2-2. First Bus Bar 70)

The first bus bar 70 electrically connects the inverter 24 and the second terminal structure 62, in the PCU case 50. In the first embodiment, the first bus bar 70 itself forms an input/output terminal of the PCU case 50. A different terminal may be provided on the tip end of the first bus bar 70 instead. As shown in FIG. 3, the first bus bar 70 has a first bus bar piece 74 and a second bus bar piece 76, which are tightened together and fixed to the first terminal block 72 with a bolt 78. The first bus bar 70 may include additional bus bar pieces, or may be configured of a single bus bar piece.

The first bus bar piece 74 has: a first plate-like portion 80 arranged at the extreme tip of the first bus bar 70; and a first base-side portion 82 arranged adjacent to the first plate-like portion 80 closer to the base side than the first plate-like portion 80, and bent with respect to the first plate-like portion 80. Although the first base-side portion 82 is substantially perpendicular to the first plate-like portion 80, the form is not limited to this, and the first base-side portion may be bent at other angles.

A surface 90 (hereinafter referred to as "first flat surface 90") of the first plate-like portion 80 (plate-like portion) on the second terminal structure 62 side is flat, and abuts on the conductive spring member 64. Also, the first plate-like portion 80 and the first base-side portion 82 are in close contact with and fixed to the first terminal block 72. At this time, of the first plate-like portion 80, a surface 92 in close contact with the first terminal block 72 is a surface opposite to the first flat surface 90.

(A-1-6-2-3. First Terminal Block 72)

The first terminal block 72 is an insulating member (e.g. resin) that collectively fixes and supports the six first bus bars 70. The first terminal block 72 may be provided for each first bus bar 70. The first plate-like portion 80, which is the tip end of the first bus bar 70, and the first base-side portion 82 are fixed onto the first terminal block 72. The first terminal block 72 is fixed to the PCU case 50 with a bolt 94 (FIG. 3).

The first bus bar 70 and the first terminal block 72 protrude from a contact surface 96 of the PCU case 50 that abuts on the motor housing 52, and are exposed. Thus, the first bus bar 70 and the first terminal block 72 protrude into a recess 98 of the motor housing 52.

(A-1-6-3. Motor 26-Side Second Terminal Structure 62)

(A-1-6-3-1. Overall Configuration of Second Terminal Structure 62)

As shown in FIG. 3, the second terminal structure 62 has second bus bars 100 (second conductive member, conductive member), and a second terminal block 102 (second insulating member, insulating member). The total number of second bus bars 100 corresponds to that of the first bus bars 70, and is six (see number of conductive spring members 64 in FIG. 2). As can be seen from the arrangement of the conductive spring members 64 in FIG. 2, the second bus bars 100 are arranged in parallel.

(A-1-6-3-2. Second Bus Bar 100)

The second bus bar 100 electrically connects the motor 26 and the first terminal structure 60, in the motor housing 52. In the first embodiment, the second bus bar 100 itself forms an input/output terminal of the motor housing 52. A different terminal may be provided on the tip end of the second bus bar 100 instead. As shown in FIG. 3, the second bus bar 100 has a third bus bar piece 104 and a fourth bus bar piece 106, which are tightened together and fixed with a bolt 108. The second bus bar 100 may include additional bus bar pieces, or may be configured of a single bus bar piece.

The third bus bar piece 104 has: a second plate-like portion 110 arranged at the extreme tip of the second bus bar 100; and a second base-side portion 112 arranged adjacent to the second plate-like portion 110 closer to the base side than the second plate-like portion 110, and bent with respect to the second plate-like portion 110. Although the second base-side portion 112 is substantially perpendicular to the second plate-like portion 110, it may be bent at other angles.

A surface 120 (hereinafter referred to as "second flat surface 120") of the second plate-like portion 110 (plate-like portion) on the first terminal structure 60 side is flat, abuts on the conductive spring member 64, and is arranged opposite to the first plate-like portion 80. To be specific, the second flat surface 120 of the second plate-like portion 110 is arranged opposite to the first flat surface 90 of the first plate-like portion 80, and the first flat surface 90 and the second flat surface 120 are substantially parallel to each other in the first embodiment.

Also, the second plate-like portion 110 and the second base-side portion 112 are in close contact with and fixed to the second terminal block 102. At this time, of the second plate-like portion 110, a surface 122 in close contact with the second terminal block 102 is a surface opposite to the second flat surface 120.

(A-1-6-3-3. Second Terminal Block 102)

The second terminal block 102 is an insulating member (e.g. resin) that collectively fixes and supports the six second bus bars 100. The second terminal block 102 may be provided for each second bus bar 100. The second plate-like portion 110, which is the tip end of the second bus bar 100, and the second base-side portion 112 are fixed onto the second terminal block 102. The second terminal block 102 is fixed to the motor housing 52 with a bolt 114 (FIG. 3).

The second bus bar 100 and the second terminal block 102 are exposed from a surface of the motor housing 52, in the recess 98 formed in the motor housing 52. Thus, the second bus bar 100 is brought into contact with the first bus bar 70 protruding into the recess 98 of the motor housing 52.

(A-1-6-4. Conductive Spring Member 64)

The conductive spring member 64 electrically connects the first bus bar 70 on the PCU 30 side, and the second bus bar 100 on the motor 26 side. As shown in FIGS. 2 and 3, the spring member 64 is an elastic member formed into an accordion shape in which peak parts and valley parts are continually alternated. As will be mentioned later, the spring member 64 may be formed into other shapes.

The spring member 64 is formed of a conductive elastic member (metal such as copper and iron, or conductive resin). The spring member 64 is fixed to the second terminal block 102 by unillustrated fixing means. For example, wall portions 116 (FIG. 2) as fixing means may be formed in the second terminal block 102, and the spring member 64 may be fixed by being fitted into a recess formed by the wall portions 116. Instead, a bolt may be used as fixing means. In such cases, the spring member 64 has a fixing part (e.g. side wall or flange part having bolt hole, of spring member 64) to be fixed by the fixing means. Note that the spring member 64 may be fixed to the first terminal block 72 instead of the second terminal block 102.

As shown in FIG. 3, the spring member 64 is pressed by the first flat surface 90 of the first plate-like portion 80 of the first bus bar 70, and the second flat surface 120 of the second plate-like portion 110 of the second bus bar 100. Hence, the spring member 64 has multiple contact points with each of the first plate-like portion 80 and the second plate-like portion 110 (see FIG. 3). In other words, the spring member 64 has a first contact portion 130 having multiple contact points with the first plate-like portion 80, and a second contact portion 132 having multiple contact points with the second plate-like portion 80.

Of the first flat surface 90, all parts that come into contact with the spring member 64 generate stress in the direction of separating the spring member 64 from the first flat surface 90, toward the second flat surface 120 (direction of arrow Z2 in FIG. 3). Similarly, of the second flat surface 120, all parts that come into contact with the spring member 64 generate stress in the direction of separating the spring member 64 from the second flat surface 120, toward the first flat surface 90 (direction of arrow Z1 in FIG. 3).

In the first embodiment, the first bus bar 70 is fixed to the first terminal block 72, the first terminal block 72 is fixed to the PCU case 50, and the PCU case 50 is fixed to the motor housing 52. In addition, the second bus bar 100 is fixed to the second terminal block 102, the second terminal block 102 is fixed to the motor housing 52, and the motor housing 52 is fixed to the PCU case 50. Hence, the spring member 64 can be kept pressed between the first flat surface 90 and the second flat surface 120.

Here, the conductive spring member 64 is described as a component separate from the first terminal structure 60 and the second terminal structure 62. However, when manufacturing the electrical connection structure 32, the conductive spring member 64 is assembled by being combined with the first terminal structure 60 or the second terminal structure 62. Accordingly, the conductive spring member 64 may be regarded as a part of the first terminal structure 60 or the second terminal structure 62.

<A-2. Method of Manufacturing Electrical Connection Structure 32>

When manufacturing the electrical connection structure 32, the following steps are taken, for example. First, the first terminal structure 60 on the PCU 30 side, and the second terminal structure 62 on the motor 26 side are assembled separately. The assembled first terminal structure 60 is installed into the PCU case 50. The assembled second terminal structure 62 is installed into the motor housing 52. In the first embodiment, the conductive spring member 64 is assembled together with the second terminal structure 62.

Next, as shown in FIG. 2, the PCU case 50 is attached to the motor housing 52. Specifically, the first flat surface 90 (first pressing surface) of the first plate-like portion 80 of the first bus bar 70 is brought close to and into contact with the conductive spring member 64, which is arranged on the second flat surface 120 (second pressing surface) of the second plate-like portion 110 of the second bus bar 100 (contact step). This allows the spring member 64 to be pressed between the first flat surface 90 and the second flat surface 120, to form multiple contact points between the spring member 64 and each of the first flat surface 90 and the second flat surface 120 (FIG. 3).

Next, the bolts 54 (FIGS. 2 and 3) are fastened while the conductive spring member 64 is pressed by the first flat surface 90 and the second flat surface 120, and multiple contact points are formed between the spring member 64 and each of the first flat surface 90 and the second flat surface 120. This fixes the positions of the first flat surface 90 and the second flat surface 120 (fixing step). Thus, the first terminal structure 60 and the second terminal structure 62 are combined to form the electrical connection structure 32.

Note that one of or both of an operator and a manufacturing system assemble and install the parts. Also, the direction (approaching direction) in which the first plate-like portion 80 is brought close to the second plate-like portion 110, and the direction in which the first plate-like portion 80 presses the conductive spring member 64 are both the same direction Z2 (see FIGS. 2 and 3). In other words, the directions in which the first plate-like portion 80 and the second plate-like portion 110 move relative to each other, and the directions in which the first plate-like portion 80 and the second plate-like portion 110 press the conductive spring member 64 are both the same directions Z1, Z2.

<A-3. Effects of First Embodiment>

According to the first embodiment, the conductive spring member 64 is pressed between the first plate-like portion 80 and the second plate-like portion 110 arranged opposite to each other (FIG. 3). This allows more freedom in design or can save space, as compared to an inserting type such as that described in Japanese Patent Application Publication No. 2013-150472. For example, while a length in the insertion direction needs to be ensured for the inserting type, a length corresponding to the insertion direction (direction of arrows Z1, Z2 in FIG. 3) can be shortened if the conductive spring member 64 is pressed between the first plate-like portion 80 and the second plate-like portion 110.

Also, according to the first embodiment, the conductive spring member 64 has multiple contact points with each of the first plate-like portion 80 and the second plate-like portion 110 (FIG. 3). Hence, even if vibration of the vehicle 10 disconnects particular contact points between the conductive spring member 64 and the first plate-like portion 80 or the second plate-like portion 110, for example, it is possible to ensure contact at other contact points. Accordingly, resistance to vibration can be improved in a situation where vibration occurs, for example.

In the first embodiment, the first plate-like portion 80 has the first flat surface 90, and the second plate-like portion 110 has the second flat surface 120 arranged opposite to the first flat surface 90 (FIG. 3). The conductive spring member 64 is pressed by the first flat surface 90 and the second flat surface 120, and has multiple contact points with each of the first flat surface 90 and the second flat surface 120 (FIG. 3). This can further shorten the length of the structure in the direction (direction of arrows Z1, Z2 in FIG. 3) perpendicular to the first flat surface 90 and the second flat surface 120.

In the first embodiment, the first plate-like portion 80 is arranged at the extreme tip of the first bus bar 70 (first conductive member), and the second plate-like portion 110 is placed at the extreme tip of the second bus bar 100 (second conductive member) and faces the first plate-like portion 80 (FIG. 3). This allows the first bus bar 70 and the second bus bar 100 to come into contact with each other at the extreme tips thereof, through the conductive spring member 64. Hence, the whole electrical connection structure 32 can be downsized.

In the first embodiment, the electrical connection structure 32 includes
the first terminal block 72 (first insulating member) fixedly supporting the first bus bars 70 (first conductive member),
the second terminal block 102 (second insulating member) fixedly supporting the second bus bars 100 (second conductive member),
the PCU case 50 (first case, converter case) fixedly supporting the first terminal block 72, and
the motor housing 52 (second case) fixedly supporting the second terminal block 102 (second insulating member), and fixed to the PCU case 50 (FIGS. 2 and 3).

Thus, the first bus bar 70, the second bus bar 100, the first terminal block 72, the second terminal block 102, the PCU case 50, and the motor housing 52 are fixed as a whole. Accordingly, contact between the first bus bar 70 and the second bus bar 100 through the conductive spring member 64 can be more surely secured.

For example, when the electrical connection structure 32 is in a state where it is likely to vibrate, the phases of vibration of the first bus bar 70 and the second bus bar 100 may be shifted, since the first bus bar 70 and the second bus bar 100 are connected through the conductive spring member 64. Meanwhile, since the first bus bar 70 and the second bus bar 100 are connected and fixed through the first terminal block 72, the second terminal block 102, the PCU case 50, and the motor housing 52, the phases of vibration of the first bus bar 70 and the second bus bar 100 are less likely to be shifted. Hence, contact between the first bus bar 70 and the second bus bar 100 through the conductive spring member 64 can be more surely secured.

In the first embodiment, of the first plate-like portion 80, the surface 92 on the opposite side of the first flat surface 90 is in close contact with and fixed to the first terminal block 72 (first insulating member). Of the second plate-like portion 110, the surface 122 on the opposite side of the second flat surface 120 is in close contact with and fixed to the second terminal block 102 (second insulating member) (FIG. 3). Hence, it is easier to prevent shifts in the phase of vibration of each of the first flat surface 90 and the second flat surface 120, as compared to a case where the surface 92 on the opposite side of the first flat surface 90 is not in close contact with the first terminal block 72, or the surface 122 on the opposite side of the second flat surface 120 is not in close contact with the second terminal block 102 (e.g. Japanese Patent Application Publication No. 2009-136041).

In the first embodiment, the first bus bar 70 includes the first base-side portion 82 that is arranged adjacent to the first plate-like portion 80 closer to the base side than the first plate-like portion 80, and bent with respect to the first plate-like portion 80 (FIG. 3). Also, the first plate-like portion 80 and the first base-side portion 82 are in close contact with and fixed to the first terminal block 72 (FIG. 3). Hence, the first bus bar 70 can be fixed more firmly to the first terminal block 72.

In the first embodiment, the second bus bar 100 includes the second base-side portion 112 that is arranged adjacent to the second plate-like portion 110 closer to the base side than the second plate-like portion 110, and bent with respect to the second plate-like portion 110. Also, the second plate-like portion 110 and the second base-side portion 112 are in close contact with and fixed to the second terminal block 102 (second insulating member) (FIG. 3). Hence, not only can the first bus bar 70 be fixed more firmly to the first terminal block 72, but also the second bus bar 100 can be fixed more firmly to the second terminal block 102. Accordingly, it is easier to prevent shifts in the phase of vibration of each of the first plate-like portion 80 and the second plate-like portion 110.

B. Second Embodiment

<B-1. Configuration of Vehicle 10A>
[B-1-1. Overall Configuration (Difference from First Embodiment)]

Figure 4:
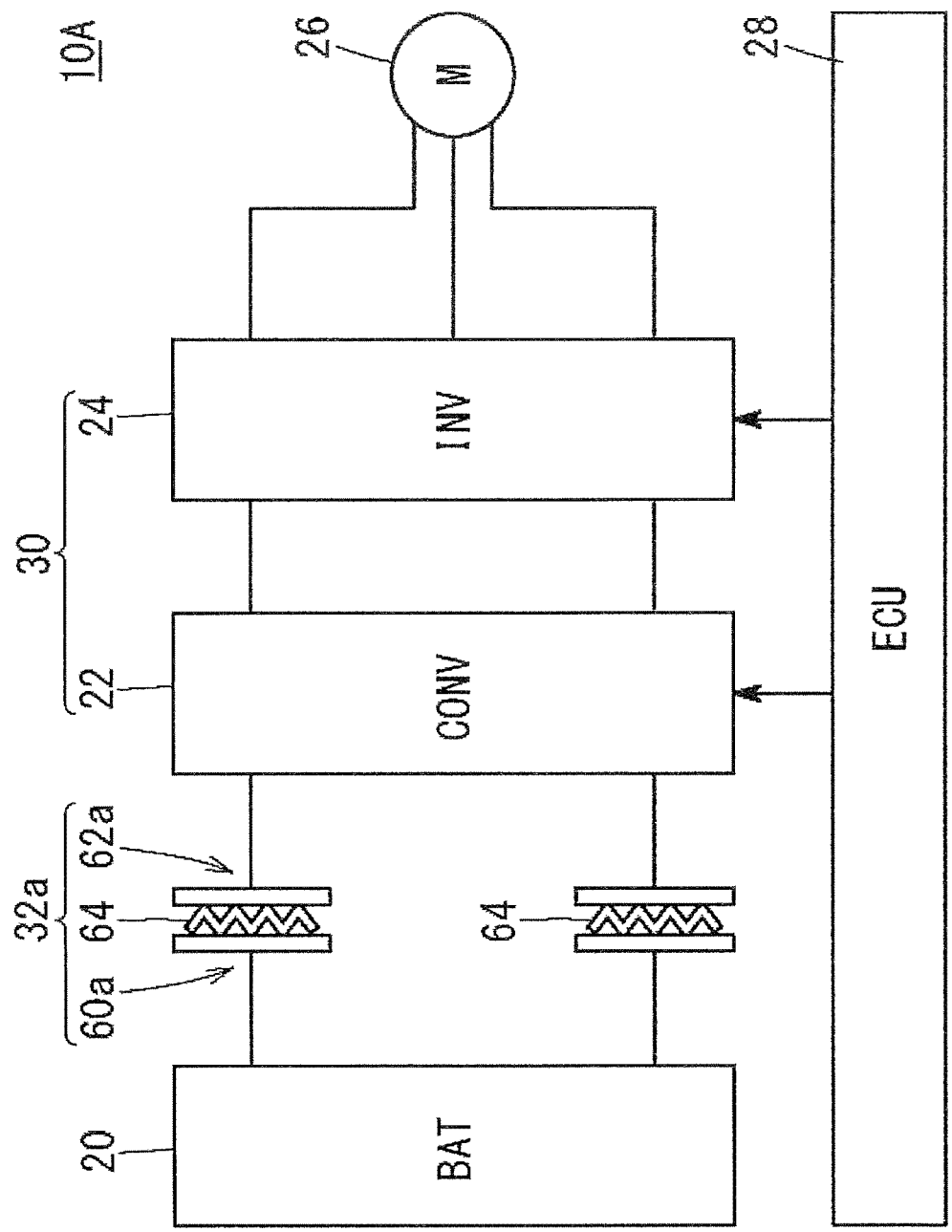
FIG. 4 is a diagram showing an electric circuit, which is a part of a vehicle of a second embodiment.
Figure 5:
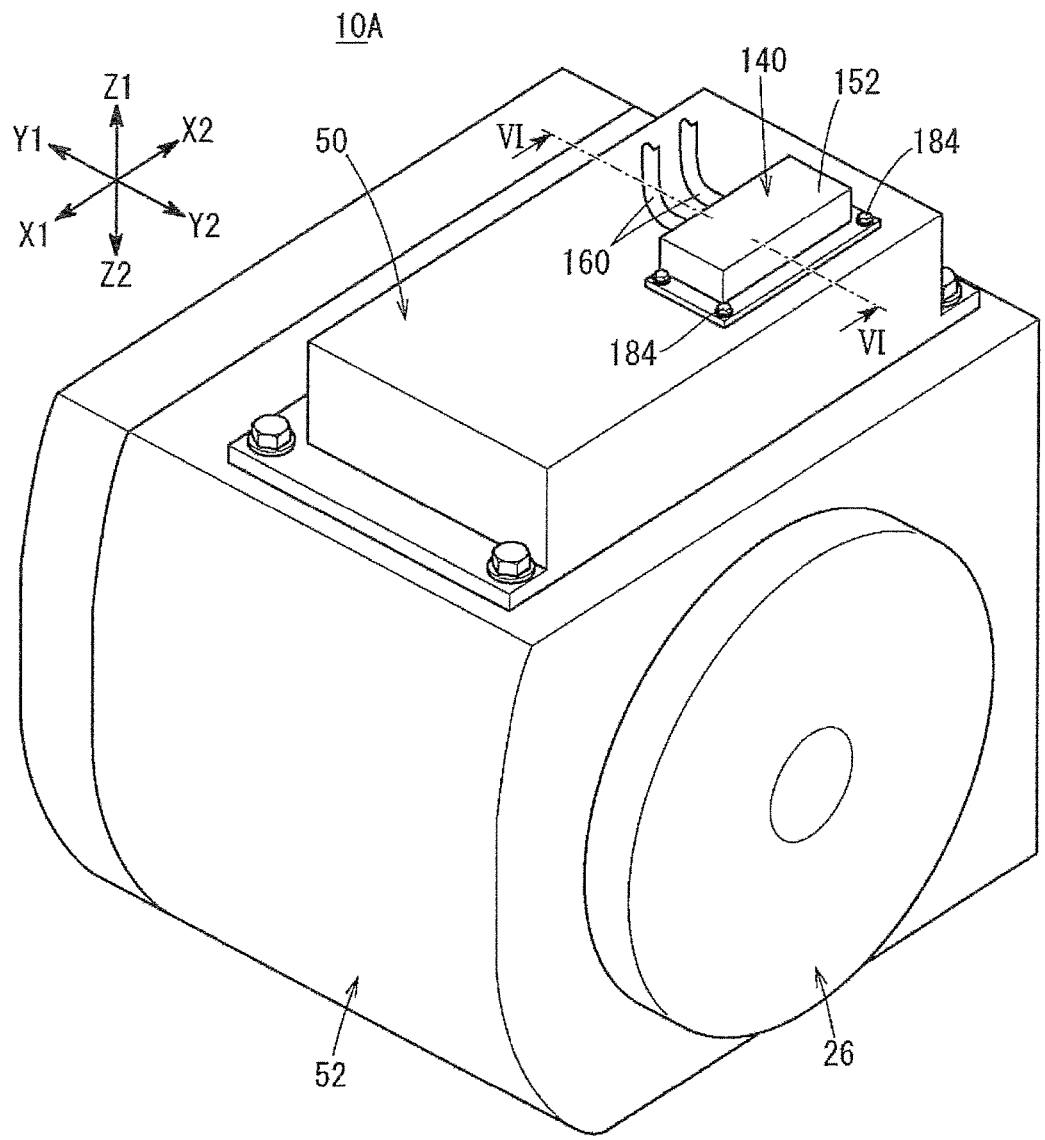
FIG. 5 is a simplified perspective view of a part of the vehicle of the second embodiment.
Figure 6:
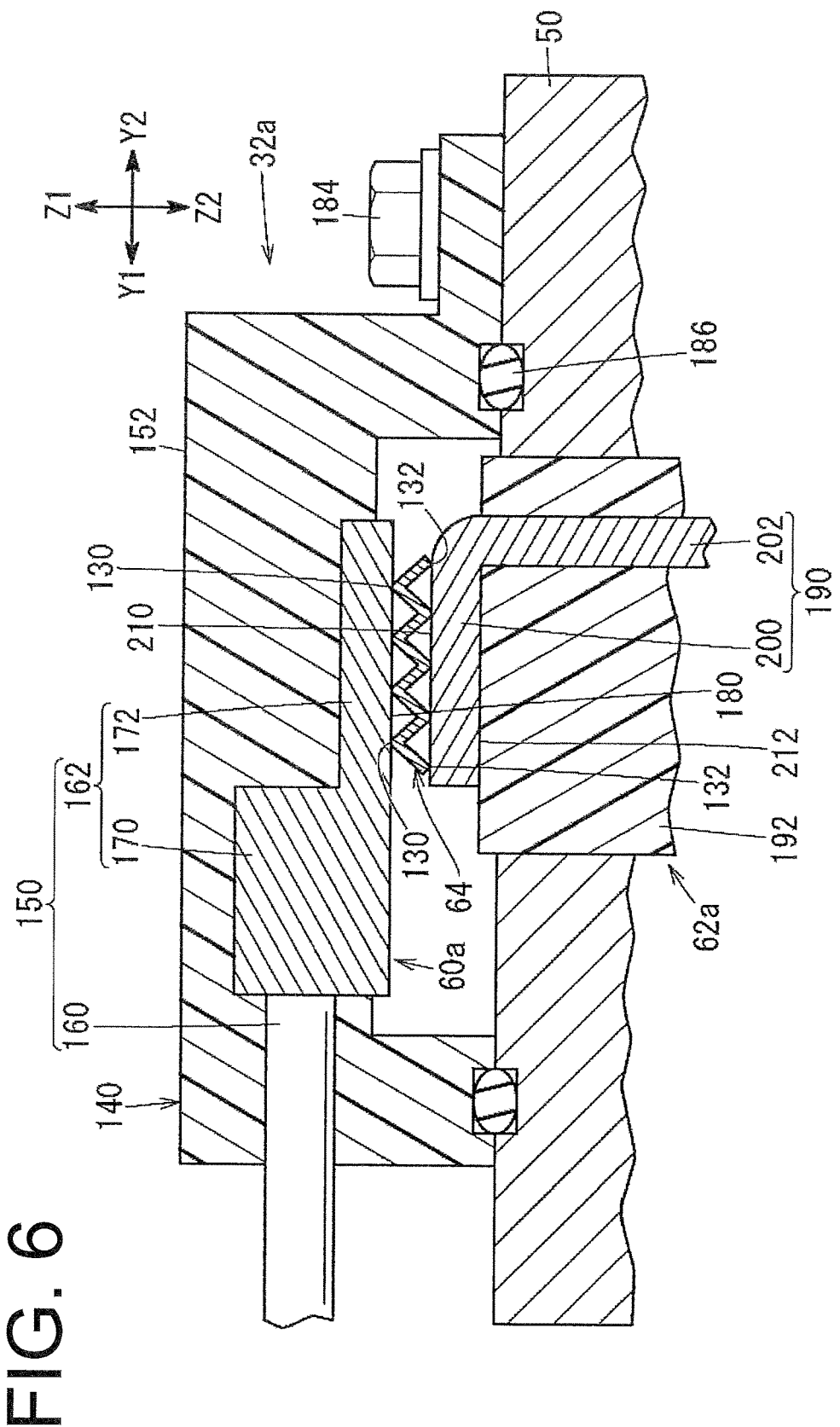
FIG. 6 is a simplified cross-sectional view taken along line VI-VI of FIG. 5.

FIG. 4 is a diagram showing an electric circuit, which is a part of a vehicle 10A of a second embodiment of the present invention. FIG. 5 is a simplified perspective view of a part of the vehicle 10A of the second embodiment. FIG. 6 is a simplified cross-sectional view taken along line VI-VI of FIG. 5. Components similar to those of the first embodiment are assigned the same reference numerals, and detailed descriptions thereof will be omitted.

In the first embodiment, the electrical connection structure 32 is provided in a part where it connects the motor 26 and the PCU 30 (FIG. 1), the first terminal structure 60 is provided in the PCU case 50, and the second terminal structure 62 is provided in the motor housing 52 (FIGS. 2 and 3). Meanwhile, in the second embodiment, an electrical connection structure 32a is provided in a part where it connects a battery 20 and a PCU 30 (FIG. 4), a first terminal structure 60a is provided in an additional case 140, and a second terminal structure 62a is provided in a PCU case 50 (FIGS. 5 and 6). The additional case 140 is a case additionally provided in the PCU case 50. Note that the electrical connection structure 32 of the first embodiment and the electrical connection structure 32a of the second embodiment may be combined.

[B-1-2. Electrical Connection Structure 32a]

(B-1-2-1. Overview)

As shown in FIGS. 4 and 6, the electrical connection structure 32a has the first terminal structure 60a on the battery 20 side, the second terminal structure 62a on the PCU 30 side, and a conductive spring member 64.

(B-1-2-2. Battery 20-Side First Terminal Structure 60a)

(B-1-2-2-1. Overall Configuration of First Terminal Structure 60a)

As shown in FIG. 6, the first terminal structure 60a has wirings 150 (first conductive member) and a resin mold portion 152 (first insulating member, insulating member). In the second embodiment, the wirings 150 of the first terminal structure 60a are arranged in direct current parts, and therefore the total number of wirings is two (or a multiple of two) (see FIG. 4).

(B-1-2-2-2. Wiring 150)

The wiring 150 electrically connects the battery 20 and the second terminal structure 62a, in the additional case 140. The wiring 150 has a cable 160 and a crimp terminal 162. The cable 160 is cylindrical, for example. The crimp terminal 162 has a crimped portion 170 crimped around the cable 160, and a first plate-like portion 172 arranged at the extreme tip of the wiring 150.

A surface 180 (hereinafter referred to as "first flat surface 180") of the first plate-like portion 172 (plate-like portion) on the second terminal structure 62a side is flat, and abuts on the conductive spring member 64. Also, a part of the cable 160 and a part of the first plate-like portion 172 are buried into the resin mold portion 152 (also referred to as "mold portion 152" below). The cable 160 is drawn out from a lateral face (left surface in FIG. 6) of the mold portion 152. Hence, the wiring 150 extends substantially parallel to the first plate-like portion 172, inside the mold portion 152.

(B-1-2-2-3. Resin Mold Portion 152)

The resin mold portion 152 is a cover for protecting contact portions between the conductive spring member 64 and each of the first terminal structure 60a and the second terminal structure 62a. The resin mold portion is also an insulating member that collectively fixes and supports the multiple wirings 150. The mold portion 152 may be provided for each wiring 150. The mold portion 152 is fixed to the PCU case 50 with bolts 184. Also, a seal member 186 is arranged between the PCU case 50 and the mold portion 152.

(B-1-2-3. PCU 30-Side Second Terminal Structure 62a)

(B-1-2-3-1. Overall Configuration of Second Terminal Structure 62a)

As shown in FIG. 6, the second terminal structure 62a has bus bars 190 (second conductive member, conductive member) and a terminal block 192 (second insulating member, insulating member). The total number of bus bars 190 of the second terminal structure 62a corresponds to the number of wirings 150, and is two (or a multiple of two) (see FIG. 4).

(B-1-2-3-2. Bus Bar 190)

The bus bar 190 electrically connects the PCU 30 (converter 22) and the first terminal structure 60a, in the PCU case 50. In the second embodiment, the bus bar 190 itself forms an input/output terminal of the PCU case 50. A different terminal may be provided on the tip end of the bus bar 190 instead.

The bus bar 190 has: a second plate-like portion 200 arranged at the extreme tip of the bus bar 190; and a second base-side portion 202 arranged adjacent to the second plate-like portion 200 closer to the base side than the second plate-like portion 200, and bent with respect to the second plate-like portion 200. Although the second base-side portion 202 is substantially perpendicular to the second plate-like portion 200, it may be bent at other angles.

A surface 210 (hereinafter referred to as "second flat surface 210") of the second plate-like portion 200 (plate-like portion) on the first terminal structure 60a side is flat, abuts on the conductive spring member 64, and is arranged opposite to the first plate-like portion 172. To be specific, the second flat surface 210 of the second plate-like portion 200 is arranged opposite to the first flat surface 180 of the first plate-like portion 172, and the first flat surface 180 and the second flat surface 210 are substantially parallel to each other in the second embodiment.

Hence, the spring member 64 is pressed by the first flat surface 180 of the first plate-like portion 172, and the second flat surface 210 of the second plate-like portion 200. At this time, the spring member 64 has multiple contact points with each of the first plate-like portion 172 and the second plate-like portion 200 (see FIG. 6).

Also, the second plate-like portion 200 and the second base-side portion 202 are in close contact with and fixed to the terminal block 192. At this time, of the second plate-like portion 200, a surface 212 in close contact with the terminal block 192 is a surface opposite to the second flat surface 210.

(B-1-2-3-3. Terminal Block 192)

The terminal block 192 is an insulating member (e.g. resin) that collectively fixes and supports the two bus bars 190. The terminal block 192 may be provided for each bus bar 190. The second plate-like portion 200, which is the tip end of the bus bar 190, and the second base-side portion 202 are fixed onto the terminal block 192. The terminal block 192 is fixed to the PCU case 50 with an unillustrated bolt.

<B-2. Method of Manufacturing Electrical Connection Structure 32a>

When manufacturing the electrical connection structure 32a, the following steps are taken, for example. First, the first terminal structure 60a on the battery 20 side, and the second terminal structure 62a on the PCU 30 side are formed separately. The first terminal structure 60a is obtained by configuring the additional case 140 with the resin mold portion 152 formed around the wiring 150. The assembled second terminal structure 62a is installed into the PCU case 50. In the second embodiment, the conductive spring member 64 is assembled together with the second terminal structure 62a.

Next, the additional case 140 is attached to the PCU case 50 (see FIG. 5). Specifically, the first flat surface 180 (first pressing surface) of the first plate-like portion 172 of the wiring 150 is brought close to and into contact with the conductive spring member 64, which is arranged on the second flat surface 210 (second pressing surface) of the second plate-like portion 200 of the bus bar 190. This allows the spring member 64 to be pressed between the first flat surface 180 and the second flat surface 210, to form multiple contact points between the spring member 64 and each of the first flat surface 180 and the second flat surface 210 (FIG. 6).

Next, the bolts 184 (FIGS. 5 and 6) are fastened while the conductive spring member 64 is pressed by the first flat surface 180 and the second flat surface 210, and multiple contact points are formed between the spring member 64 and each of the first flat surface 180 and the second flat surface 210. This fixes the positions of the first flat surface 180 and the second flat surface 210. Thus, the first terminal structure 60a and the second terminal structure 62a are combined to form the electrical connection structure 32a.

Note that one of or both of an operator and a manufacturing system assemble and install the parts. Also, the direction (approaching direction) in which the first plate-like portion 172 is brought close to the second plate-like portion 200, and the direction in which the first plate-like portion 172 presses the conductive spring member 64 are both the same direction Z2 (see FIGS. 5 and 6). In other words, the directions in which the first plate-like portion 172 and the second plate-like portion 200 move relative to each other, and the directions in which the first plate-like portion 172 and the second plate-like portion 200 press the conductive spring member 64 are both the same directions Z1, Z2.

<B-3. Effects of Second Embodiment>

According to the second embodiment described above, the following effect can be achieved in addition to or instead of the effects of the first embodiment.

Specifically, according to the second embodiment, the wiring 150 (first conductive member) extends parallel to the first plate-like portion 172, inside the mold portion 152 (first insulating member) (FIG. 6). This can reduce the dimension of the structure in the direction (direction of arrows Z1, Z2 in FIG. 6) perpendicular to the first flat surface 180 and the second flat surface 210.

C. Modifications

Note that the present invention is not limited to the above embodiments, and may adopt various configurations based on the description of the specification, as a matter of course. For example, the following configurations may be adopted.

<C-1. Application>

In the above embodiments, the electrical connection structures 32, 32a are applied to the vehicles 10, 10A (FIGS. 1 and 4). However, focusing on the use of the conductive spring member 64, for example, the invention is not limited to this, and is applicable to other apparatuses and systems. Examples of such apparatuses and systems include aircrafts, movable bodies such as ships, manufacturing systems, electric household appliances, and precision machinery.

<C-2. Driving Motor 26>

In the above embodiments, the driving motor 26 is a three-phase AC brushless motor. However, focusing on the use of the conductive spring member 64, for example, the invention is not limited to this, and the motor 26 may be a DC or brush motor.

<C-3. PCU 30 (Converter)>

In the above embodiments, the PCU 30 includes the converter 22 and the inverter 24 (FIGS. 1 and 4). However, from the viewpoint of controlling output of the motor 26, for example, the invention is not limited to this. For example, the converter 22 may be omitted, so that the PCU 30 includes only the inverter 24. Instead, if the motor 26 is a DC motor, the inverter 24 may be omitted from the PCU 30.

<C-4. Electrical Connection Structure 32, 32a>

[C-4-1. First Conductive Member and Second Conductive Member]

In the first embodiment, the first bus bar 70 is provided as the conductive member (first conductive member) on the PCU 30 side, and the second bus bar 100 is provided as the conductive member (second conductive member) on the motor 26 side (FIG. 3). Also, in the second embodiment, the wiring 150 is provided as the conductive member (first conductive member) on the battery 20 side, and the bus bar 190 is provided as the conductive member (second conductive member) on the PCU 30 side (FIG. 6).

However, focusing on the use of the conductive spring member 64, for example, the combination of conductive members (first conductive member and second conductive member) provided on one and the other side of the conductive spring member 64 is not limited to these. For example, the first bus bar 70 and the second bus bar 100 of the first embodiment may be replaced with the wiring 150 of the second embodiment. Also, a bus bar may be used instead of the wiring 150 of the second embodiment.

[C-4-2. First Plate-Like Portion 80, 172 and Second Plate-Like Portion 110, 200]

In the first embodiment, the electrical connection structure 32 has the first plate-like portion 80 and the second plate-like portion 110 (FIG. 3). It is assumed that the first plate-like portion 80 and the second plate-like portion 110 are formed into a flat plate shape (shape based on cuboid shape). However, from the viewpoint of pressing the conductive spring member 64 with the first plate-like portion 80 and the second plate-like portion 110, or with the first flat surface 90 and the second flat surface 120, for example, the invention is not limited to this.

For example, the first flat surface 90 or the second flat surface 120 may be formed into a plate shape other than the flat plate shape (e.g. a plate shape whose principle plane on the tip end side is semicircular, when viewed in the direction of arrow Z2 in FIG. 3). Instead, when viewed in the direction of arrow Y2 in FIG. 3, the surface 92 opposite to the first flat surface 90, or the surface 122 opposite to the second flat surface 120 may be formed into a curved surface (e.g. semicircular shape). The same is true of the first plate-like portion 172 and the second plate-like portion 200 of the second embodiment.

[C-4-3. First Flat Surface 90, 180 and Second Flat Surface 120, 210]

In the first embodiment, the first plate-like portion 80 and the second plate-like portion 110 have the first flat surface 90 and the second flat surface 120, respectively (FIG. 3). However, from the viewpoint of holding the conductive spring member 64 between the first plate-like portion 80 and the second plate-like portion 110 in a pressed state, for example, the invention is not limited to this.

For example, the surface (pressing surface) of the first plate-like portion 80 and/or the second plate-like portion 110 that presses the conductive spring member 64 may be a curved surface. In this case, the direction of a force of the curved surface applied on the conductive spring member 64, is the same as the direction (direction of arrow Y2 in FIG. 3) in which the first plate-like portion 80 and the conductive spring member 64 are brought close to and into contact with each other at the time of assembly. The same is true of the first flat surface 180 and the second flat surface 210 of the second embodiment (FIG. 6).

In the first embodiment, the first plate-like portion 80 is formed at the extreme tip of the first bus bar 70, and the second plate-like portion 110 is arranged at the extreme tip of the second bus bar 100 (FIG. 3). However, from the viewpoint of forming the first plate-like portion 80 in the first bus bar 70 and the second plate-like portion 110 in the second bus bar 100, for example, the invention is not limited to this. For example, the first bus bar 70 may be extended to come into contact with a left lateral face of the first terminal block 72 in FIG. 3, and the first plate-like portion 80 may be provided in an intermediate part of the first bus bar 70. The same is true of the first plate-like portion 172 and the second plate-like portion 200 of the second embodiment.

[C-4-4. Conductive Spring Member 64]

In the first embodiment, the conductive spring member 64 is formed into an accordion shape in which peak parts and valley parts are continually alternated (or a single plate bent at multiple parts to form continual peaks and valleys) (FIGS. 2 and 3). However, focusing on providing multiple contact points with each of the first flat surface 90 and the second flat surface 120 (or with each of first plate-like portion 80 and second plate-like portion 110), for example, the invention is not limited to this. For example, a single or multiple coil springs may be laid on their side (such that axial direction of coil spring is parallel to first flat surface 90 and second flat surface 120). The same is true of the second embodiment.

In the first embodiment, the conductive spring member 64 is fixed to the second terminal block 102 (FIGS. 2 and 3). However, from the viewpoint of fixing the spring member 64, for example, the invention is not limited to this. For example, the spring member 64 may be fixed to any of the first terminal block 72 (first insulating member), the first bus bar 70 (first conductive member), and the second bus bar 100 (second conductive member). Note that as a method of fixing the spring member 64 to the first bus bar 70, a flange part having a bolt hole may be formed in the spring member 64, a bolt hole may be formed in the first bus bar 70, and the spring member 64 may be fixed to the first bus bar 70 with a bolt, for example.

In the first embodiment, to keep the conductive spring member 64 in a pressed state between the first flat surface 90 and the second flat surface 120 (or between first plate-like portion 80 and second plate-like portion 110), on the PCU 30 side, the first bus bar 70 is fixed to the first terminal block 72, the first terminal block 72 is fixed to the PCU case 50, and the PCU case 50 is fixed to the motor housing 52 (FIGS. 2 and 3). Meanwhile, on the motor 26 side, the second bus bar 100 is fixed to the second terminal block 102, the second terminal block 102 is fixed to the motor housing 52, and the motor housing 52 is fixed to the PCU case 50 (FIGS. 2 and 3).

However, the method or configuration for maintaining the pressed state of the conductive spring member 64 is not limited to this. For example, the pressed state of the conductive spring member 64 may be maintained by fixing the first terminal block 72 and the second terminal block 102 with fixing means, such as a bolt. Instead, as long as the conductive spring member 64 is in a pressed state when assembly of the electrical connection structure 32 is completed, the conductive spring member 64 before assembly of the electrical connection structure 32 (when associated with second terminal structure 62 (e.g. when supported by second terminal block 102)) need not be fixed to the second terminal structure 62.

[C-4-5. First Insulating Member and Second Insulating Member]

In the first embodiment, the first plate-like portion 80 is directly or brought into close contact with and fixed to the first terminal block 72, and the second plate-like portion 110 is directly or brought into close contact with and fixed to the second terminal block 102. However, from the viewpoint of pressing the conductive spring member 64 between the first plate-like portion 80 and the second plate-like portion 110, for example, the invention is not limited to this. For example, as in the case of the pressure contact portion 16 in FIG. 1 of Japanese Patent Application Publication No. 2009-136041, the part need not be directly supported by an insulating member. In other words, a structure may be configured without providing an insulating member for the first plate-like portion 80 and/or the second plate-like portion 110.

According to the present embodiment, the conductive spring member is pressed between the first plate-like portion and the second plate-like portion arranged opposite to each other. This allows more freedom in design or can save space, as compared to an inserting type such as that described in Japanese Patent Application Publication No. 2013-150472. For example, while a length in the insertion direction needs to be ensured for the inserting type, a length corresponding to the insertion direction can be shortened if the conductive spring member is pressed between the first plate-like portion and the second plate-like portion.

Also, according to the present embodiment, the conductive spring member has multiple contact points with each of the first plate-like portion and the second plate-like portion. Hence, even when the electrical connection structure is in a state where it is likely to vibrate, and particular contact points between the conductive spring member and the first plate-like portion or the second plate-like portion are disconnected, for example, it is possible to ensure contact at other contact points. Accordingly, resistance to vibration can be improved in a situation where vibration occurs, for example.

The first plate-like portion may have a first flat surface. The second plate-like portion may have a second flat surface arranged opposite to the first flat surface. The conductive spring member may be pressed by the first flat surface and the second flat surface, and have the multiple contact points with each of the first flat surface and the second flat surface. This can further shorten the length of the structure in the direction perpendicular to the first flat surface and the second flat surface.

The first plate-like portion may be arranged at the extreme tip of the first conductive member. The second plate-like portion may be placed at the extreme tip of the second conductive member and face the first plate-like portion. This allows the first conductive member and the second conductive member to come into contact with each other at the extreme tips thereof, through the conductive spring member. Hence, the whole electrical connection structure can be downsized.

The first conductive member, the second conductive member, the first insulating member, the second insulating member, the first case, and the second case are fixed as a whole. Accordingly, contact between the first conductive member and the second conductive member through the conductive spring member can be more surely secured.

For example, when the electrical connection structure is in a state where it is likely to vibrate, the phases of vibration of the first conductive member and the second conductive member may be shifted, since the first conductive member and the second conductive member are connected through the conductive spring member. Meanwhile, since the first conductive member and the second conductive member are connected and fixed through the first insulating member, the second insulating member, the first case, and the second case, the phases of vibration of the first conductive member and the second conductive member are less likely to be shifted. Hence, contact between the first conductive member and the second conductive member through the conductive spring member can be more surely secured.

The first conductive member and the second conductive member may include a bus bar. The first insulating member may be a first terminal block to which a tip end of the first conductive member is fixed. The second insulating member may be a second terminal block to which a tip end of the second conductive member is fixed.

Of the first plate-like portion, a surface on the opposite side of the first flat surface may be in close contact with and fixed to the first insulating member. Of the second plate-like portion, a surface on the opposite side of the second flat surface may be in close contact with and fixed to the second insulating member. With this, it is easier to prevent shifts in the phase of vibration of each of the first flat surface and the second flat surface, as compared to a case where the surface on the opposite side of the first flat surface is not in close contact with the first insulating member, or the surface on the opposite side of the second flat surface is not in close contact with the second insulating member (e.g. Japanese Patent Application Publication No. 2009-136041).

The first conductive member may include a first base-side portion that is arranged adjacent to the first plate-like portion closer to the base side than the first plate-like portion, and is bent with respect to the first plate-like portion. The first plate-like portion and the first base-side portion may be in close contact with and fixed to the first insulating member. With this, the first conductive member can be fixed more firmly to the first insulating member.

The second conductive member may include a second base-side portion that is arranged adjacent to the second plate-like portion closer to the base side than the second plate-like portion, and is bent with respect to the second plate-like portion. The second plate-like portion and the second base-side portion may be in close contact with and fixed to the second insulating member. With this, not only can the first conductive member be fixed more firmly to the first insulating member, but also the second conductive member can be fixed more firmly to the second insulating member. Accordingly, it is easier to prevent shifts in the phase of vibration of each of the first plate-like portion and the second plate-like portion.

The present invention can achieve at least one of more freedom in design, space saving, and ensuring of a stable contact.

Obviously, numerous modifications and variations of the present invention are possible in light of the above teachings. It is therefore to be understood that within the scope of the appended claims, the invention may be practiced otherwise than as specifically described herein.

What is claimed is:

1. An electrical connection structure comprising:
   a first bus bar including a first plate;
   a second bus bar including a second plate opposite to the first plate; and
   a conductive spring provided between the first plate and the second plate so as to be pressed by the first plate and the second plate and including a plurality of first contact points contacting with the first plate and a plurality of second contact points contacting with the second plate.

2. The electrical connection structure according to claim 1, wherein:
   the first plate has a first flat surface;
   the second plate has a second flat surface arranged opposite to the first flat surface; and
   the conductive spring is pressed by the first flat surface and the second flat surface, and has the plurality of the first and second contact points with each of the first flat surface and the second flat surface.

3. The electrical connection structure according to claim 1, wherein:
   the first plate is arranged at the extreme tip of the first bus bar; and
   the second plate is arranged at the extreme tip of the second bus bar and faces the first plate.

4. The electrical connection structure according to claim 1, further comprises:
   a first insulator fixedly supporting the first bus bar;
   a second insulator fixedly supporting the second bus bar;
   a first case fixedly supporting the first insulator; and
   a second case fixedly supporting the second insulator and fixed to the first case.

5. The electrical connection structure according to claim 4, wherein:
   the first insulator is a first terminal block to which a tip end of the first bus bar is fixed; and
   the second insulator is a second terminal block to which a tip end of the second bus bar is fixed.

6. The electrical connection structure according to claim 5, wherein:
   of the first plate, a surface on the opposite side of the first surface is in close contact with and fixed to the first insulator; and
   of the second plate, a surface on the opposite side of the second surface is in close contact with and fixed to the second insulator.

7. The electrical connection structure according to claim 1, further comprises:
   a first insulator supporting and in direct contact with the first bus bar.

8. The electrical connection structure according to claim 7, further comprises:
   a second insulator supporting and in direct contact with the second bus bar.

9. The electrical connection structure according to claim 1, wherein:
   the first plate has a first surface that is continuously flat in a first area;
   the second plate has a second surface that is continuously flat in a second area, the second area being arranged opposite to the first area;
   the plurality of first contact points contacting the first surface in the first area; and
   the plurality of second contact points contacting the second surface in the second area.

10. An electrical connection structure comprising:
    a first conductor including a first plate;
    a second conductor including a second plate opposite to the first plate;
    a conductive spring provided between the first plate and the second plate so as to be pressed by the first plate and the second plate and including a plurality of first contact points contacting with the first plate and a plurality of second contact points contacting with the second plate;
    a first insulator fixedly supporting the first conductor;
    a second insulator fixedly supporting the second conductor;
    a first case fixedly supporting the first insulator; and
    a second case fixedly supporting the second insulator and fixed to the first case, wherein:
    the first conductor includes a first base-side portion that is arranged adjacent to the first plate closer to the base side than the first plate, and is bent with respect to the first plate; and
    the first plate and the first base-side portion are in close contact with and fixed to the first insulator.

11. The electrical connection structure according to claim 10, wherein:
the second conductor includes a second base-side portion that is arranged adjacent to the second plate closer to the base side than the second plate, and is bent with respect to the second plate; and
the second plate and the second base-side portion are in close contact with and fixed to the second insulator.

12. A terminal structure comprising:
a conductor including a plate;
an insulator supporting and in direct contact with the conductor; and
a conductive spring attached to the insulator or the conductor so as to be provided on the plate, the conductive spring comprising:
a first contact portion having a plurality of first contact points with the plate, the plurality of first contact points being in a pressed contact state with the plate; and
a second contact portion opposite to the first contact portion and having a plurality of second contact points.

13. The terminal structure according to claim 12, wherein the insulator is in direct contact with the plate.

14. The terminal structure according to claim 12, wherein the plurality of first contact points is in direct contact with the plate.

15. The terminal structure according to claim 12, wherein the conductive spring includes a plate member formed into an accordion shape.

16. The terminal structure according to claim 12, wherein the conductive spring includes a coil spring oriented such that an axial direction of the coil spring is parallel to a flat surface of the plate.

17. The terminal structure according to claim 12, wherein the plurality of first contact points are not fixedly joined directly to the plate.

18. The terminal structure according to claim 12, wherein more than two first contact points of the plurality of first contact points directly contact the plate.

19. A vehicle comprising:
a driving motor;
a converter to convert an input current input to the driving motor or an input voltage input to the driving motor;
a motor housing accommodating the driving motor;
a converter case accommodating the converter and attached to the motor housing;
a first bus bar having a first surface and connecting the converter with an output terminal of the converter case;
a second bus bar having a second surface opposite to the first surface and connecting an input terminal of the motor housing with the driving motor; and
a conductive spring provided between the first surface and the second surface so as to be pressed by the first surface and the second surface and having a plurality of first contact points contacting with the first surface and a plurality of second contact points contacting with the second surface.

* * * * *